United States Patent
Shima et al.

(10) Patent No.: US 10,983,195 B2
(45) Date of Patent: Apr. 20, 2021

(54) OBJECT DETECTION APPARATUS

(71) Applicant: DENSO CORPORATION, Kariya (JP)

(72) Inventors: Tatsuya Shima, Kariya (JP); Akiyoshi Mizutani, Kariya (JP)

(73) Assignee: DENSO CORPORATION, Kariya (JP)

( * ) Notice: Subject to any disclaimer, the term of this patent is extended or adjusted under 35 U.S.C. 154(b) by 87 days.

(21) Appl. No.: 16/305,788

(22) PCT Filed: Jun. 2, 2017

(86) PCT No.: PCT/JP2017/020683
§ 371 (c)(1),
(2) Date: Nov. 29, 2018

(87) PCT Pub. No.: WO2017/209292
PCT Pub. Date: Dec. 7, 2017

(65) Prior Publication Data
US 2019/0293759 A1    Sep. 26, 2019

(30) Foreign Application Priority Data

Jun. 2, 2016  (JP) .............................. JP2016-110840

(51) Int. Cl.
*G01S 7/41*    (2006.01)
*G01S 13/58*   (2006.01)
(Continued)

(52) U.S. Cl.
CPC ................ *G01S 7/414* (2013.01); *G01S 7/41* (2013.01); *G01S 7/415* (2013.01); *G01S 13/584* (2013.01);
(Continued)

(58) Field of Classification Search
CPC combination set(s) only.
See application file for complete search history.

(56) References Cited

U.S. PATENT DOCUMENTS

| 2011/0006941 A1 | 1/2011 | Samukawa et al. |
| 2011/0221628 A1* | 9/2011 | Kamo .................... G01S 7/295 |
| | | 342/70 |

(Continued)

FOREIGN PATENT DOCUMENTS

| JP | 2011-017634 A | 1/2011 |
| JP | 2012-018058 A | 1/2012 |

(Continued)

*Primary Examiner* — Mamadou L Diallo
(74) *Attorney, Agent, or Firm* — Maschoff Brennan (57) ABSTRACT

A target detection apparatus includes a target detection section, a following section, a reception tendency determination section, and a target determination section. The reception tendency determination section determines a tendency of received electrical power of a reflected wave from the objective target relative to a distance from the vehicle to the objective target on the basis of a result of following the objective target by the following section. The target determination section determines the objective target as a high target allowing the vehicle to pass under, when the reception tendency determination section determines that the received electrical power has a tendency to be constant regardless of the distance to the objective target.

5 Claims, 10 Drawing Sheets

(51) Int. Cl.
G01S 13/931 (2020.01)
G01S 13/93 (2020.01)
G01S 13/66 (2006.01)

(52) U.S. Cl.
CPC .............. *G01S 13/66* (2013.01); *G01S 13/93* (2013.01); *G01S 13/931* (2013.01)

(56) References Cited

U.S. PATENT DOCUMENTS

| | | | |
|---|---|---|---|
| 2011/0301845 A1* | 12/2011 | Harada | B60R 21/0134 |
| | | | 701/301 |
| 2015/0015434 A1* | 1/2015 | Okita | G01S 13/04 |
| | | | 342/27 |
| 2015/0362592 A1 | 12/2015 | Mizutani et al. | |
| 2016/0003941 A1 | 1/2016 | Satou | |
| 2017/0045610 A1 | 2/2017 | Mizutani | |
| 2017/0363732 A1* | 12/2017 | Ishimori | G01S 7/024 |
| 2017/0363736 A1* | 12/2017 | Kaino | G01S 13/32 |
| 2018/0284774 A1* | 10/2018 | Kawamoto | G01C 21/26 |
| 2018/0356507 A1* | 12/2018 | Ichinose | G01S 13/933 |

FOREIGN PATENT DOCUMENTS

| | | |
|---|---|---|
| JP | 2014-126497 A | 7/2014 |
| JP | 2014-169996 A | 9/2014 |
| JP | 2015-206646 A | 11/2015 |

\* cited by examiner

OBJECT DETECTION APPARATUS

CROSS-REFERENCE TO RELATED APPLICATION

The present application is a national stage application of PCT Application No. PCT/JP2017/020683, filed on Jun. 2, 2017, which is based on and claims the benefit of priority from Japanese Patent Application No. 2016-110840, filed in Japan Patent Office on Jun. 2, 2016, the entire description of which is incorporated herein by reference.

TECHNICAL FIELD

The present disclosure relates to a target detection apparatus that generates information on a target present in a forward direction of a vehicle.

BACKGROUND ART

In-vehicle radar apparatuses are known that detect information on a target having reflected a radar wave, such as a distance to the target, a relative speed of the target to the vehicle, and an azimuth of the target, by sending and receiving the radar wave. As an in-vehicle radar apparatus of this type, there is such the apparatus as described in PTL 1 below which estimates a height of a target from a road surface, the target continuously detected over a plurality of measurement cycles, from electrical power distribution of the received power, specifically a production pattern of a null point.

CITATION LIST

Patent Literature

[PTL 1] JP 2011-17634 A

SUMMARY OF THE INVENTION

The null point is a point where the received electrical power greatly decreases due to multipath influence, and occurs at a distance interval in accordance with a height of the target from the road surface. Specifically, if the target is located on the road surface, a multipath phenomenon does not occur in a reflected wave from the target and thus a null point does not occur in the received electrical power of the reflected wave from the target located on the road surface. In contrast, if the target is in a position higher than the road surface, a higher height of the target causes a greater path difference in the multipath phenomenon and thus a null point occurs at a narrower distance interval. When the height of the target reaches a certain height or more, a null point does not occur. As a result of detailed investigations by the inventor, a problem was found that whether the detected target is a high target allowing passage-under may not be correctly distinguished even using a null pattern.

In one aspect of the present disclosure, it is desirable to provide a target detection apparatus capable of highly accurately distinguishing a high target allowing a vehicle to pass under.

Such an aspect of the present disclosure is a target detection apparatus including a target detection section, a following section, a reception tendency determination section, and a target determination section. The target detection section sends and receives a radar wave at every measurement cycle set in advance, and detects a target in a traveling direction of the vehicle from a detection result of a radar sensor detecting a position and a speed of a reflection point where the radar wave is reflected. The following section follows an objective target that is a target detected over the plurality of measurement cycles by the target detection section. The reception tendency determination section determines a tendency of received electrical power of a reflected wave from the objective target relative to a distance from the vehicle to the objective target on the basis of a result of following the objective target by the following section. The target determination section determines, when the reception tendency determination section determines that the received electrical power has a tendency to be constant regardless of the distance to the objective target, the objective target as a high target allowing the vehicle to pass under.

A radar beam irradiated from an antenna has a wider width as it is further from the antenna. Accordingly, a high target distant from the vehicle may be captured by the irradiated radar beam, while a high target near the vehicle is out of the irradiated radar beam. Thus, in the received electrical power of the reflected wave from the high target at a height allowing the vehicle to pass under, an amount of increase of the received electrical power due to the shorter distance between the vehicle and the target and an amount of decrease of the received electrical power due to the high target being out of the radar beam are canceled. Hence, the received electrical power has a tendency to be constant regardless of the distance to the target. In contrast, for the received electrical power of a reflected wave from a target at a height not allowing the vehicle to pass under, such as another vehicle and a manhole, the target is not out of the radar beam even when the vehicle gets closer to the target, leading to a tendency to increase the received electrical power as the vehicle gets closer to the target. Use of such characteristics allows highly accurate determination of whether an objective target allows a vehicle to pass under by a simplified technique to determine a tendency of receive electrical power relative to a distance to the target.

The reference signs in parentheses described in the claims represent correspondence with specific means described in the embodiments described later as individual modes of the present disclosure and do not limit the technical scope of the present disclosure.

DESCRIPTION OF EMBODIMENTS

With reference to the drawings, exemplified embodiments to carry out the present disclosure will be described below.

First Embodiment

<Overall Configuration>

Figure 1:
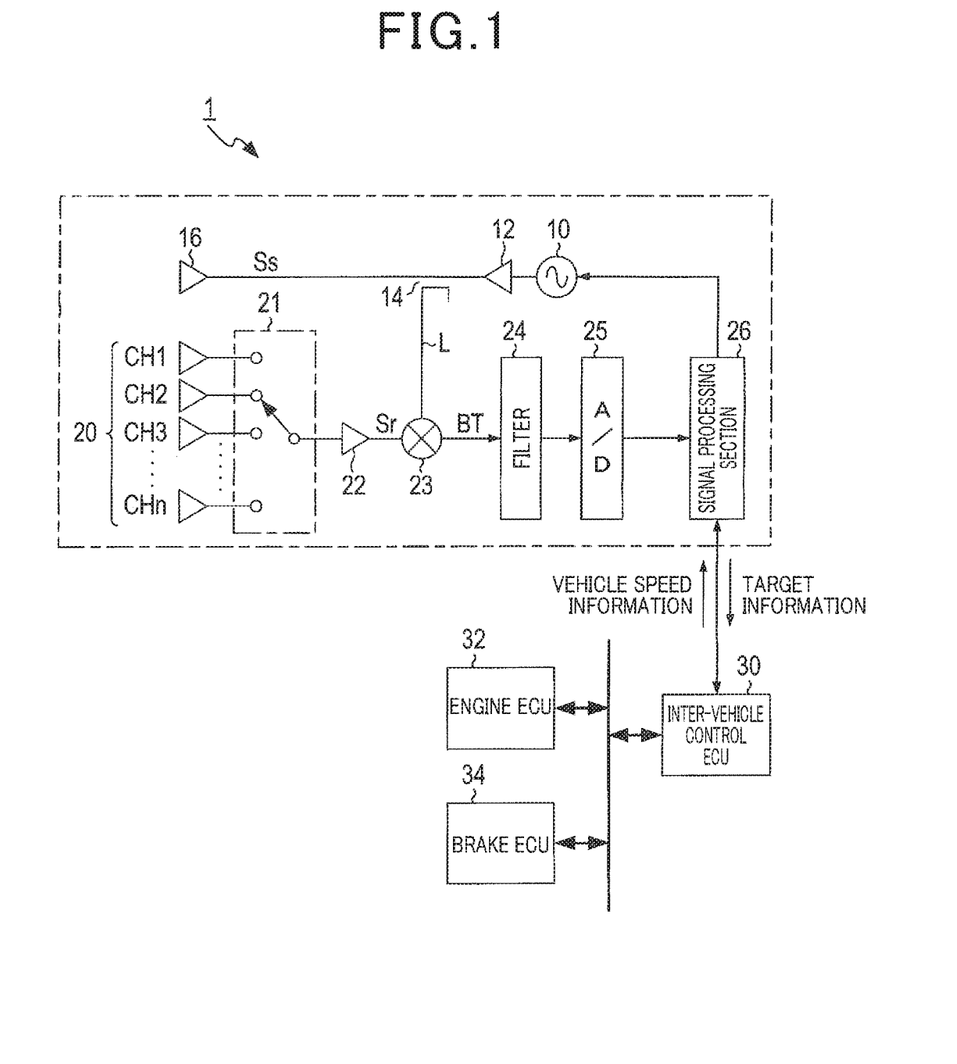
FIG. 1 is a block diagram illustrating a configuration of a vehicle control system.

A vehicle control system to which the present disclosure is applied is installed in a vehicle and, as illustrated in FIG. 1, includes an inter-vehicle control ECU 30, an engine ECU 32, and a brake ECU 34. The ECUs 30, 32, and 34 are connected to each other via a LAN communication bus. Each of the ECUs 30, 32, and 34 include a microcomputer provided with a CPU, a ROM, a RAM, and a semiconductor memory such as a flash memory. In addition, each of the ECUs 30, 32, and 34 includes at least a bus controller for communication via the LAN communication bus. The inter-vehicle control ECU 30 is connected to, not shown, an alarm buzzer, a cruise control switch, a goal inter-vehicle distance setting switch, and the like and is also connected to a radar sensor 1.

The radar sensor 1 is an FMCW millimeter-wave radar and is a device that recognizes a target, such as a leading vehicle and a roadside object, by sending and receiving a frequency-modulated radar wave in a millimeter wave band. The radar sensor 1 then generates target information as information on the target thus recognized (hereinafter, a recognized target) to send it to the inter-vehicle control ECU 30. FMCW is an abbreviation of a frequency modulated continuous wave.

The target information includes a distance to the recognized target, a relative speed of the recognized target to the vehicle, an azimuth where the recognized target is located, a degree of a probability of a collision between the vehicle and the recognized target, estimated values of size, such as a height and a width, of the recognized target having a high probability of a collision with the vehicle, and the like.

<Configuration of Radar Sensor>

The configuration of the radar sensor 1 is then described in detail. The radar sensor 1 includes an oscillator 10, an amplifier 12, a distributor 14, a sending antenna 16, a receiving antenna section 20, an amplifier 22, a mixer 23, a filter 24, an A/D converter 25, and a signal processing section 26.

The oscillator 10 starts in accordance with a command from the signal processing section 26 and generates a high frequency signal in a millimeter wave band modulated so as to have an ascending section in which the frequency linearly increases with time and a descending section in which the frequency linearly decreases. The amplifier 12 amplifies the high frequency signal generated by the oscillator 10. The distributor 14 divides the output of the amplifier 12 into a sending signal Ss and a local signal L. The sending antenna 16 irradiates a radar wave corresponding to the sending signal Ss.

The receiving antenna section 20 includes n receiving antennas that receive a radar wave. Each of the antennas is set so as to have a beam width covering the entire beam width of the sending antenna 16, and CH1 through CHn are assigned to the respective antennas. The sign n denotes an integer of one or more. A receiving switch 21 sequentially selects any of the n receiving antennas included in the receiving antenna section 20 and provides a received signal Sr from the selected receiving antenna to a subsequent stage of the receiving antenna section 20.

The amplifier 22 amplifies the received signal Sr provided from the receiving switch 21. The mixer 23 mixes the received signal Sr amplified by the amplifier 22 with the local signal L provided from the distributor 14 to generate a beat signal BT. The filter 24 removes unnecessary signal components from the beat signal BT generated by the mixer 23. The A/D converter 25 samples the output of the filter 24 and converts it to digital data.

The signal processing section 26 controls start or stop of the oscillator 10 and sampling of the beat signal BT via the A/D converter 25. The signal processing section 26 also performs communication with the inter-vehicle control ECU 30 and signal processing using sampling data, and receives information required for signal processing, such as a vehicle speed, and sends target information obtained as a result of the signal processing.

The signal processing section 26 includes a microcomputer provided with a CPU, a ROM, a RAM, and a semiconductor memory such as a flash memory. The signal processing section 26 further includes an arithmetic unit, such as a DSP, for executing fast Fourier transform (hereinafter, FFT) processing and the like for the data imported from the A/D converter 25.

The signal processing section 26 achieves a function of, as part of the signal processing functions, an object detection section, a following section, a reception tendency determination section, a target determination section, and a determination value calculation section by causing the CPU to execute a program stored in a non-transitory tangible storage medium. A technique for achieving these functions is not limited to software and all or part of the functions may be achieved using hardware combining a logic circuit, an analog circuit, and the like. The signal processing section 26 may include one microcomputer or may include a plurality of microcomputers.

<Target Information Generation Process>

Figure 2:
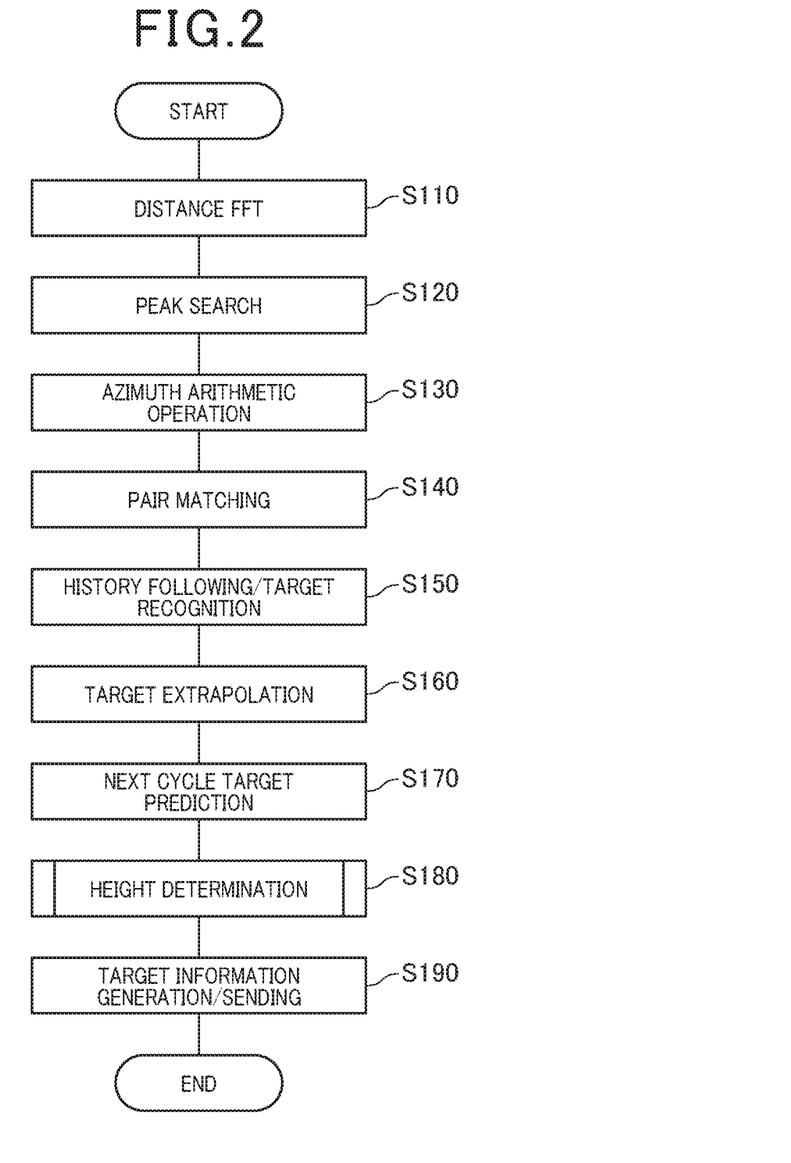
FIG. 2 is a flowchart illustrating a processing procedure for generating target information.

With reference to the flowchart illustrated in FIG. 2, a processing procedure for generating target information will be described. Where one period of radar wave modulation is defined as a measurement cycle, the signal processing section 26 repeatedly executes the present process procedure at every measurement cycle.

First, in S110, a frequency analysis process, specifically FFT processing, is executed for sampling data of one modulation period accumulated during the last measurement cycle to calculate a power spectrum of the beat signal BT for the respective channels CH1 to CHn and for each ascending and descending section of the radar wave.

Subsequently, in S120, a peak search is performed to extract a frequency component as a peak on the power spectrum calculated in S110 (hereinafter, a peak frequency component). Such a peak frequency component extracted in the peak search includes peak frequency components adapted to a predicted value in S180 described later and peak frequency components other than them. If a peak frequency component adapted to the predicted value is not found, the peak frequency component is assumed to be buried in noise or other peak frequency components and a peak frequency component is extrapolated. To be adapted means to coincide within tolerance set in advance. The extrapolated peak frequency component is set at a signal level of zero or a noise level.

Subsequently, in S130, for each peak frequency component and each modulation section other than those extrapolated out of the peak frequency components extracted in S120, an azimuth arithmetic process is executed to obtain an arrival direction of the reflected wave producing the peak frequency. Specifically, n peak frequency components at the identical frequency collected from the respective channels CH1 through CHn are subjected to a frequency analysis process, specifically FFT processing or a superresolution method, such as MUSIC.

Subsequently, in S140, a pair matching process is executed. The pair matching process is a process for setting a combination of the peak frequency component during the ascending modulation and the peak frequency component during the descending modulation extracted in S120. Specifically, for the signal level of the peak frequency component extracted in S120 and the arrival direction calculated in S130, two approximately coinciding peaks are combined, specifically, two peaks having a difference between them of a coincidence determination threshold or less that is set in advance. Further, for each combination thus set, a distance and a relative speed are calculated using a known technique in FMCW radar to register only a combination having the calculated distance less than an upper limit distance set in advance and the calculated speed less than an upper limit speed set in advance as a proper pair, that is, a reflection point of the radar wave.

Subsequently, in S150, for each pair registered in S140 in the measurement cycle at this time (hereinafter, a current cycle pair), a history following process is executed. The history following process is a process for determining whether the current cycle pair represents the identical target to that of a pair registered in S140 in the last measurement cycle (hereinafter, a last cycle pair), that is, whether there is a connection history.

Specifically, on the basis of information on the last cycle pair, a predicted position and a predicted speed of the current cycle pair corresponding to those of the last cycle pair are calculated to calculate a positional difference and a speed difference, which are the differences between the predicted position and the predicted speed, and a detected position and a detected speed obtained from the current cycle pair. If the calculated positional difference and the speed difference are less than an upper limit positional difference and an upper limit speed difference which are upper limits set in advance, a connection history is determined to be found. Further, a pair determined to have a connection history over a plurality of measurement cycles, for example, five cycles is recognized as a target. The current cycle pair sequentially takes over information on the last cycle pair with a connection history, for example, the number of connection history, an extrapolation counter and an extrapolation flag described later, and the like.

Subsequently, in S160, defining a target recognized in S150 in the current cycle as a current cycle target and a target recognized in S150 in a previous cycle as a previous cycle target, a target extrapolation process is executed. The target extrapolation process is a process for generating, if there is a previous cycle target that has no connection history with a current cycle target, an extrapolation pair on the basis of a predicted value for the previous cycle target to add the generated extrapolation pair to the current cycle target.

For each current cycle target, an extrapolation flag GF representing presence or absence of extrapolation and an extrapolation counter representing the number of continuous extrapolations are set. The extrapolation flag GF and the extrapolation counter are cleared to zero if the current cycle target is an actual pair which is actually detected, and the extrapolation flag GF is set to 1 and the extrapolation counter is incremented if the current cycle target is an extrapolation pair. When a count value of the extrapolation counter has reached a discarding threshold set in advance, the target is discarded assuming to be lost.

Subsequently, in S170, for each current cycle target registered in S150 and S160, a next cycle target prediction process is executed to obtain a peak frequency to be detected in the next cycle and an azimuth angle to be detected.

Subsequently, in S180, on the basis of the information obtained in S110 through S170 described above and the vehicle speed information obtained from the in-vehicle control ECU 30, a height determination process is executed to determine a height of a static target. Details of the height determination process are described later.

Subsequently, in S190, for each recognized target, target information is generated that includes a speed, a position, an azimuth angle, and the height estimated in S180 of the target to send the target information thus generated to the in-vehicle cruise control ECU 30. The present process is finished here. In the present embodiment, the process from S110 to S150 corresponds to the process executed by the target detection section. The process from S150 to S170 corresponds to the process executed by the following section.

<Height Determination Process>

Figure 3:
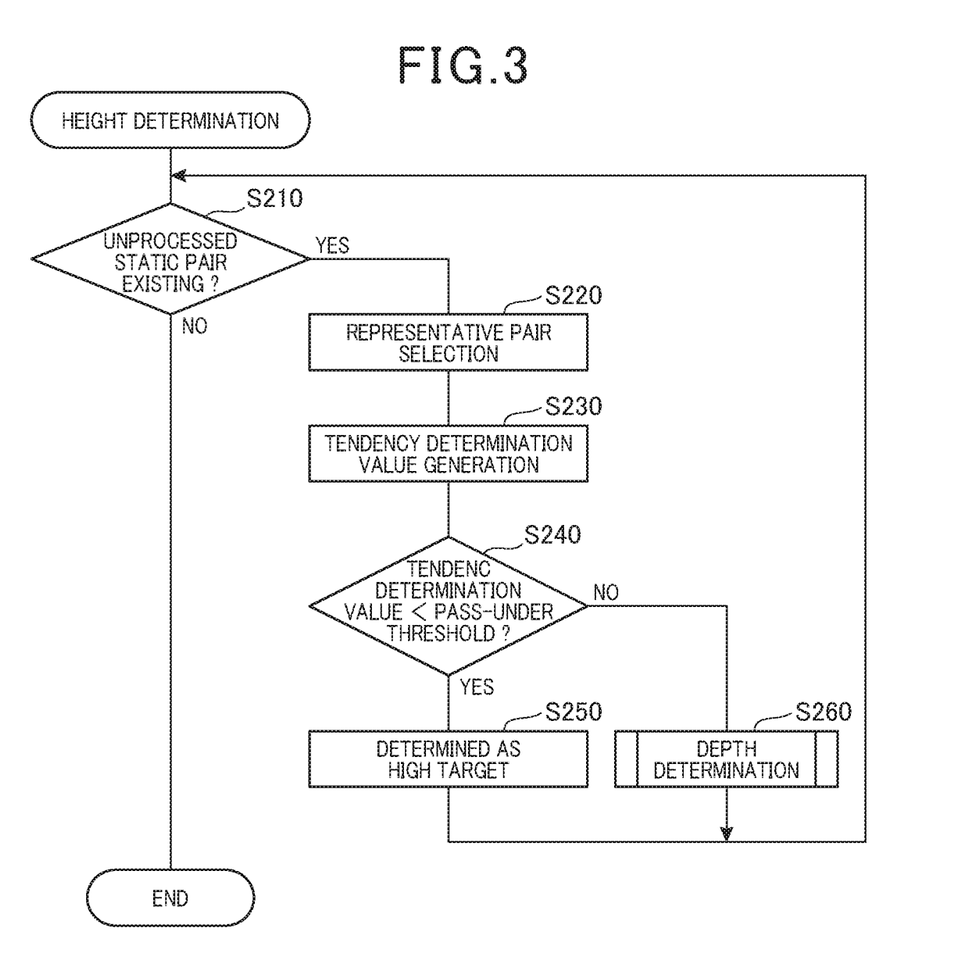
FIG. 3 is a flowchart illustrating a processing procedure for determining a height of a target.

The details of the height determination process executed in S180 above are then described with reference to the flowchart illustrated in FIG. 3.

First, in S210, a pair determined to have a connection history over a plurality of cycles and corresponding to a static target is defined as a static pair, and determination is made whether there is an unprocessed static pair not subjected to the process from S220 to S260 described later. The static pair is defined as a pair, for example, having a relative speed within ±5 km/h of an own vehicle speed. If there is no unprocessed static pair, the present process is finished here.

If there is an unprocessed static pair, in S220, a pair satisfying a representative condition is selected as a representative pair out of the unprocessed static pairs. Herein, the representative condition is that the pair is present in a position closest to the own vehicle.

Subsequently, in S230, for the selected representative pair, a tendency determination value is generated that represents a tendency of received electrical power of the reflected wave. The tendency determination value is an increased value of the received electrical power due to the own vehicle getting closer to the target. In this situation, the received electrical power of the reflected wave oscillates due to multipath influence. By tracing the history of the representative pair, a maximum value at a point most distant from the target out of maximum values of the received electrical power, that is, the first maximum value of the received electrical power after observation of the representative pair is started is defined as a reference value. The difference obtained by subtracting the reference value from the most recent maximum value of the received electrical power in the current measurement cycle is then defined as the tendency determination value.

Subsequently, in S240, determination is made whether the tendency determination value is less than a pass-under threshold set in advance. If the tendency determination value is less than the pass-under threshold, in S250, the static pair is determined to be based on a high target allowing the own vehicle to pass under, and a high flag is set to an on state. The present process then goes back to S210. In contrast, if the tendency determination value is the pass-under threshold or more, the static pair is determined to be based on a target not allowing the own vehicle to pass under. A depth determination process is then performed in S260 and the present process then goes back to S210. Details of the depth determination process are described later. The height determination process is finished here. In the present embodiment, the process in S230 corresponds to the process executed by the reception tendency determination section, and the processes in S240 and S250 are equivalent to the process executed by the target determination section.

<Depth Determination Process>

Figure 4:
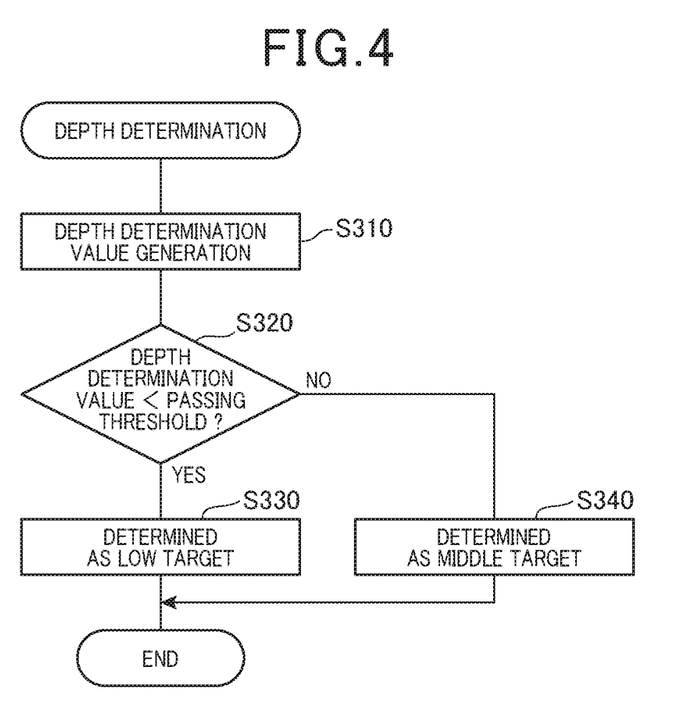
FIG. 4 is a flowchart illustrating a processing procedure for determining a depth of the target.

The details of the depth determination process executed in S260 above are described with reference to the flowchart illustrated in FIG. 4.

Figure 5:
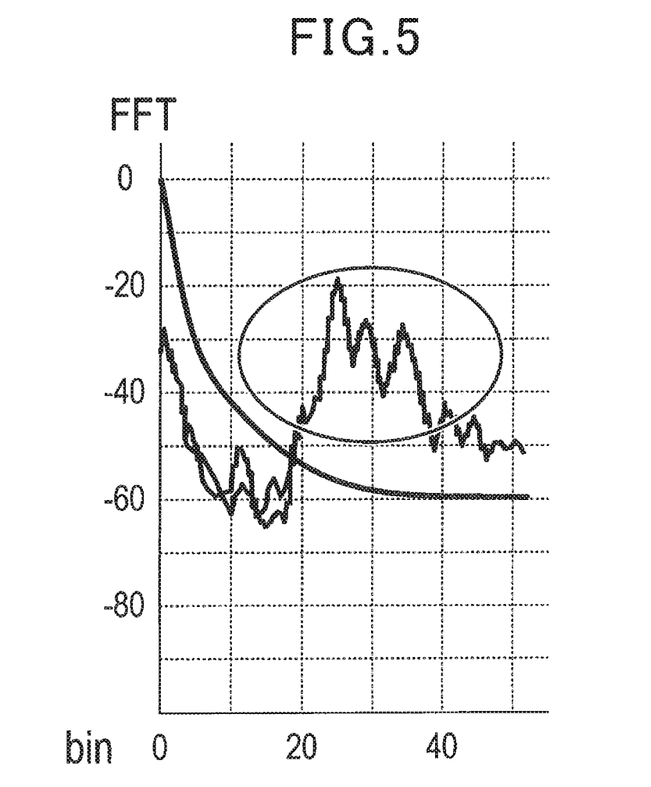
FIG. 5 is a graph illustrating a peak shape on the basis of a reflected wave from a target with some depth.
Figure 6:
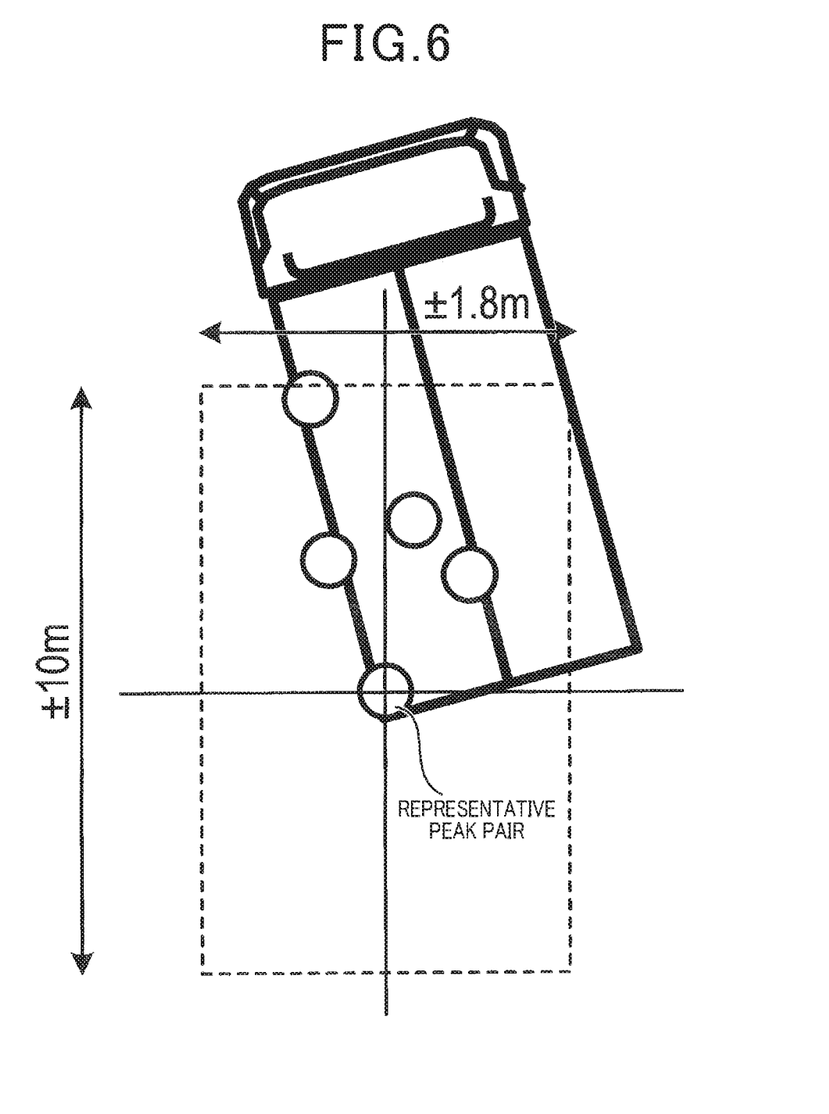
FIG. 6 is an illustrative diagram of exemplified reflection points of a target with some depth and conditions used for obtaining a representative pair and a depth determination value.

First, in S310, a depth determination value is generated for the representative pair selected in S220. As illustrated in FIG. 5, a reflected wave from a target with a depth reaches peaks at wide frequency bins, and a plurality of static pairs are obtained. Accordingly, to select a static pair derived from the identical object to the representative pair, the number of static pairs which are present in an identical recognition range set in advance and which satisfy identical target conditions, that is, the number of identical object pairs is defined as the depth determination value. As illustrated in FIG. 6, the identical recognition range is set such that the difference in a longitudinal position from the representative pair is within a range of longitudinal position selection determination values (e.g., ±10 m) set in advance and the difference in a transverse position from the representative pair is within a range of transverse position selection determination values (e.g., ±1.8 m) set in advance.

Subsequently, in S320, determination is made whether the depth determination value is less than a passing threshold (e.g., 2) set in advance. If the depth determination value is less than the passing threshold, in S330, the static pair is determined to be based on a low target allowing the own vehicle to drive over it, and a low flag is set to an on state. The depth determination process is then finished. In contrast, if the depth determination value is the passing threshold or more, in S340, the static pair is determined as a middle target not allowing the own vehicle to pass through and to drive over, that is, a middle target having a probability of a collision with the own vehicle, and a middle flag is set to an on state. The depth determination process is then finished. In the present embodiment, the process in S310 corresponds to the process executed by the determination value calculation section, and the processes in S320 through S340 correspond to the process executed by the target determination section.

<Action>

Figure 7:
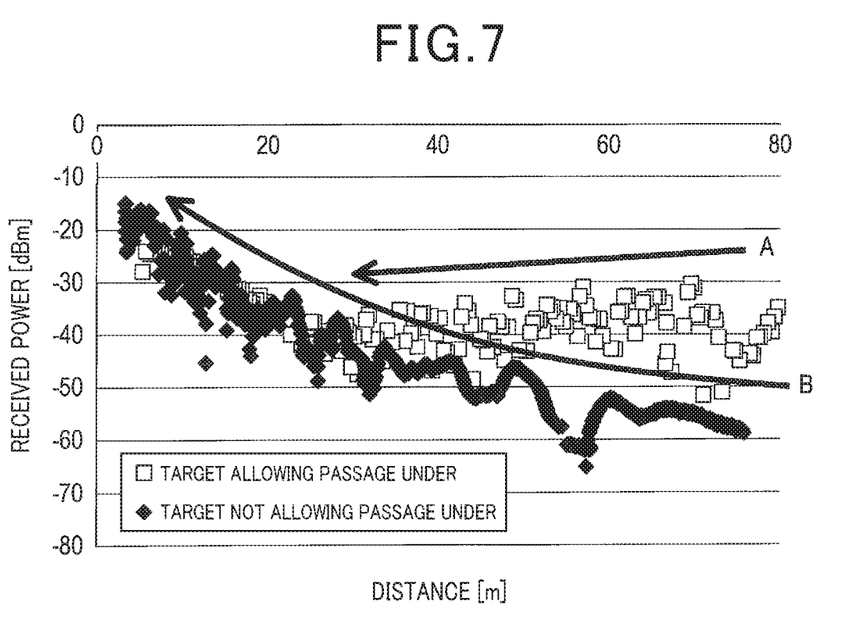
FIG. 7 is a time series graph illustrating a distance between a target allowing passage-under and a target not allowing passage-under and reception strength of reflected waves from these targets.

A radar beam irradiated from an antenna has a wider width as it is further from the antenna. A high target is at a height separated in the vertical direction from the height of installation of the sending antenna 16. A high target distant from the own vehicle may be captured by an irradiated radar beam, while a high target near the own vehicle is out of the irradiated radar beam. Accordingly, if the target is a high target, as indicated by an arrow A in FIG. 7, the received electrical power of the reflected wave from the target has a tendency to be constant regardless of the distance to the target because the amount of increase of the received electrical power due to the own vehicle getting closer to the target cancels the amount of decrease of the received electrical power due to the high target out of the radar beam.

Meanwhile, a low target and a middle target are at a height closer to the height of installation of the sending antenna 16 and are thus not out of the irradiated radar beam even when the own vehicle gets closer to the target. If the target is a low target or a middle target, as illustrated with an arrow B in FIG. 7, the received electrical power of the reflected wave from the target thus has a tendency to be gradually greater as getting closer to the target. Accordingly, from the tendency of the received electrical power of the reflected wave from the target relative to the distance from the vehicle to the target, it is possible to determine whether the target is a high target.

Figure 8:
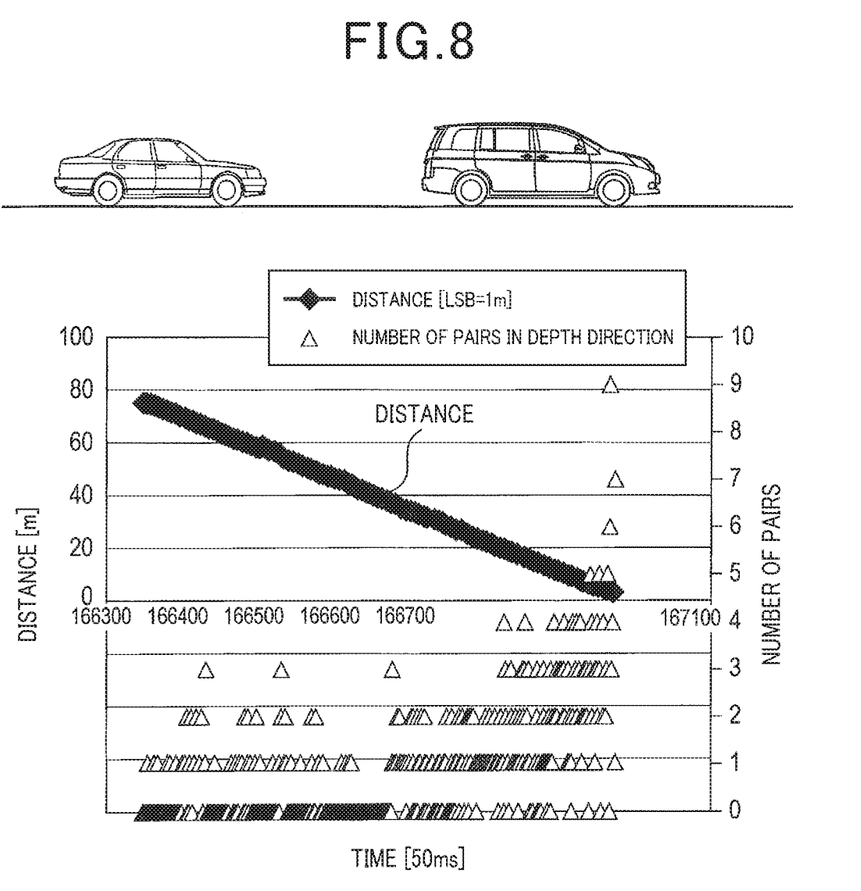
FIG. 8 is a drawing illustrating a positional relationship between an own vehicle and a middle target, a distance to the middle target, and change in the number of pairs in a depth direction.
Figure 9:
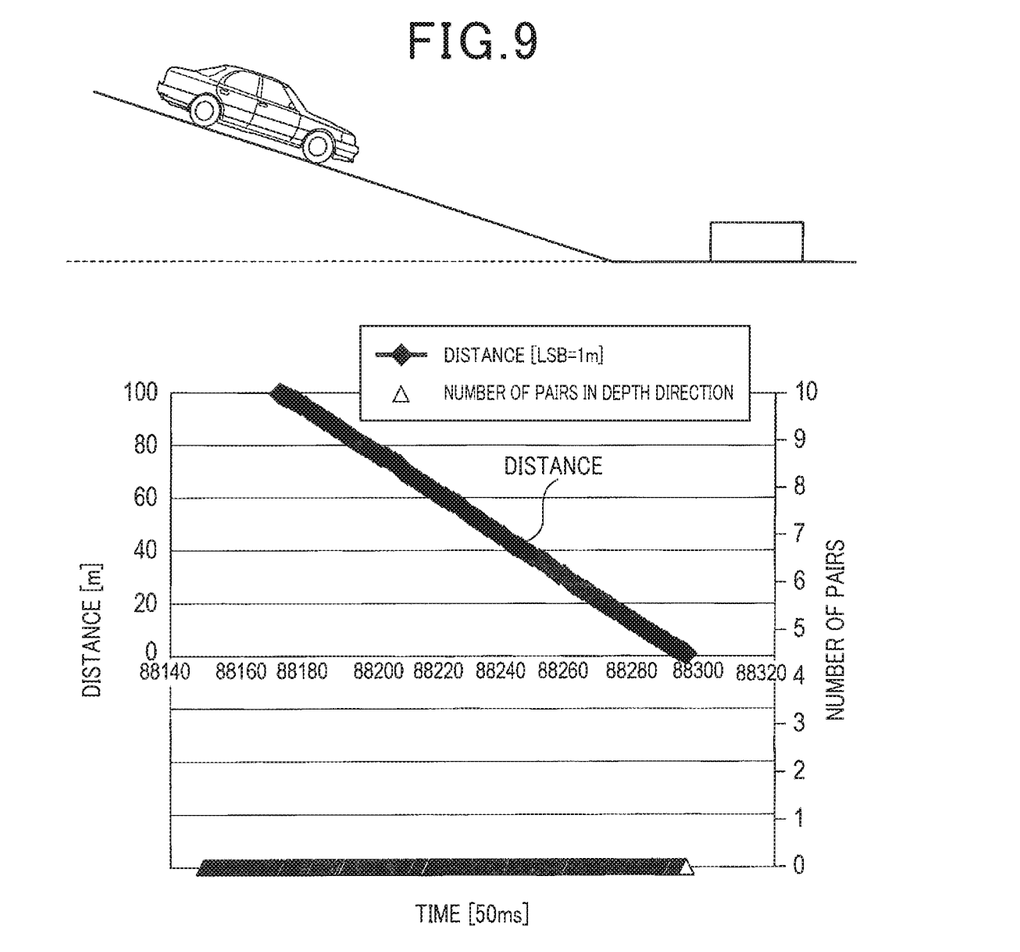
FIG. 9 is a drawing illustrating a positional relationship between the own vehicle and a low target, a distance to the low target, and change in the number of pairs in a depth direction.
Figure 10:
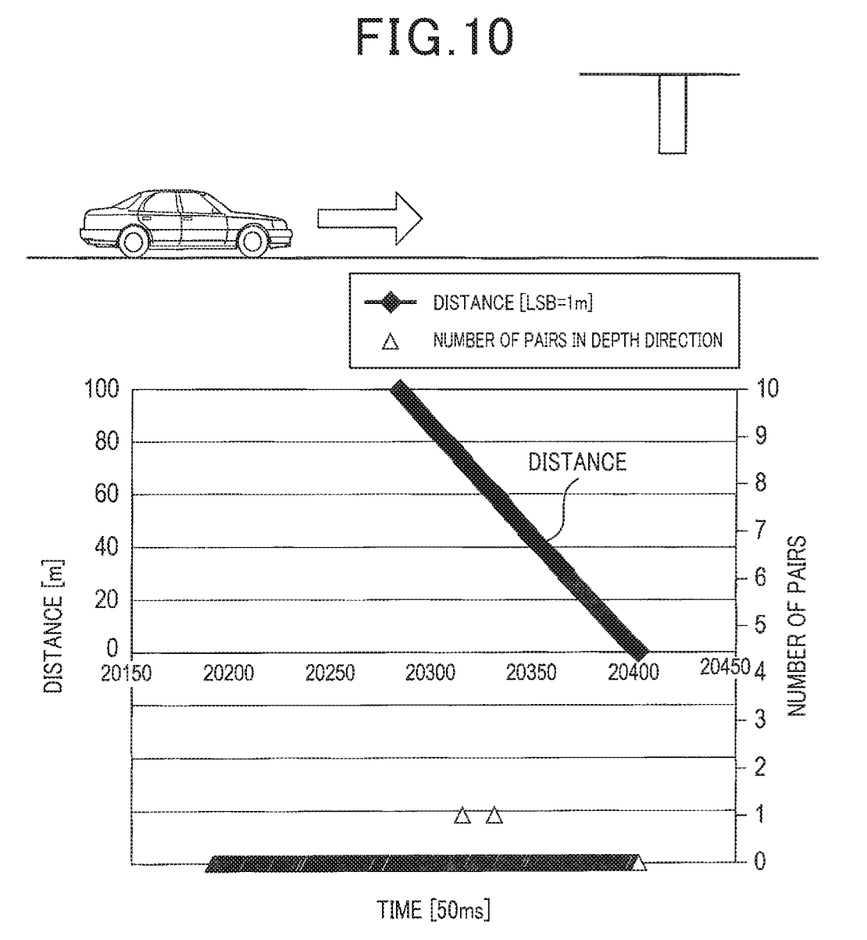
FIG. 10 is a drawing illustrating a positional relationship between the own vehicle and a high target, a distance to the high target, and change in the number of pairs in a depth direction.

Further, as illustrated in FIG. 8, a middle target, such as another vehicle, having a probability of a collision with the own vehicle has a size in the depth direction of several meters, and the depth determination value becomes three or more. Meanwhile, as illustrated in FIG. 9, a low target, such as a manhole, allowing the vehicle to drive over it, has a size in the depth direction of at most one meter and the depth determination value becomes zero. From the depth of the target, it is thus possible to judge the target as a low target or a middle target. FIGS. 8 and 9 illustrate the number of pairs other than the representative pair out of the static pairs derived from an identical target. As illustrated in FIG. 10, if the target is a high target, such as a billboard and a traffic light, the size in the depth direction is at most 1 m and the depth determination value is at most one.

<Effects>

According to the present embodiment described above, the following effects are obtained.

(1) Since received electrical power of a reflected wave from a high target has a different tendency from that of received electrical power of reflected waves from a middle target and a low target, use of the difference in tendency allows a high target to be highly accurately distinguished.

(2) Since a middle target has a greater size in the depth direction, use of a depth determination value in addition to the tendency of received electrical power allows such a middle target to be highly accurately distinguished.

(3) Since a low target has a smaller size in the depth direction, use of a depth determination value in addition to the tendency of received electrical power allows such a low target to be highly accurately distinguished.

(4) From the difference between a reference value and a maximum value of received electrical power oscillating to the distance to the target, it is possible to determine whether the received electrical power has a constant tendency or a tendency to increase relative to the distance.

OTHER EMBODIMENTS

An embodiment to carry out the present disclosure has been described above, while the present disclosure may be performed in various modifications without limited to the above embodiment.

(a) A high target is distinguished only using the tendency of the received electrical power of the reflected wave in the above embodiment, while a high target may be distinguished using a depth determination value in addition to the tendency of the received electrical power. That is, if the received electrical power has a tendency to be constant and the depth determination value is less than the passing threshold, the target may be determined as a high target. The passing threshold in this case may be the same value as the passing threshold in S320 or may be a different value. In such a manner, it is possible to distinguish a high target further more highly accurately.

(b) The tendency determination value is defined as a difference between the first maximum value and the most recent maximum value of the received electrical power after detection of the target in the above embodiment, while the present disclosure is not limited to this and the tendency determination value may be a value reflecting the tendency of the received electrical power relative to the distance to the target. For example, the tendency determination value may be a difference between the first minimum value and the most recent minimum value of the received electrical power after detection of the target. In addition, a low-pass filter may be applied to the received electrical power to define the amount of change in received electrical power, from which variable components are eliminated, as the tendency determination value.

(c) The number of static pairs present in an identical recognition range and satisfying identical target conditions is used as the depth determination value in the above embodiment, while the present disclosure is not limited to this and the depth determination value may be a parameter allowing a value reflecting the depth to be obtained.

(d) A plurality of functions included in one component in the above embodiment may be achieved by a plurality of elements, or one function included in one element may be achieved by a plurality of elements. In addition, a plurality of functions included in a plurality of elements may be achieved by one element or one function achieved by a plurality of elements may be achieved by one element. Still in addition, part of the configuration in the above embodiment may be omitted. At least part of the configuration in the above embodiment may be added to or substituted for the configuration in another embodiment above. All modes included in the technical spirit specified only by the descriptions in the claims are embodiments of the present disclosure.

(e) In addition to the target detection apparatus described above, the present disclosure may be achieved by various forms, such as a radar system having the target detection apparatus as an element, a program for allowing a computer to function as the target detection apparatus, a non-transitory tangible storage medium such as a semiconductor memory in which the program is stored, and a target detection method.

The invention claimed is:

1. A target detection apparatus, comprising:
   a target detection section configured to detect a target in a traveling direction of a vehicle from a detection result of a radar sensor that, at every measurement cycle set in advance, sends and receives a radar wave and detects a position and a speed of a reflection point where the radar wave is reflected;
   a following section configured to follow an objective target that is a target detected over a plurality of measurement cycles by the target detection section;
   a reception tendency determination section configured to determine a tendency of received electrical power of a reflected wave from the objective target relative to a distance from the vehicle to the objective target on the basis of a result of following the objective target by the following section;
   a target determination section configured to determine, when the reception tendency determination section determines that the received electrical power has a tendency to be constant regardless of the distance to the objective target, the objective target as a high target allowing the vehicle to pass under; and
   a determination value calculation section configured to calculate a depth determination value representing a depth of the objective target, wherein
   the reception tendency determination section is configured to determine the received electrical power to have a tendency to be constant when a difference obtained by subtracting a reference value from a maximum value is less than a pass-under threshold set in advance, and the reception tendency determination section is configured to determine the received electrical power to have a tendency to increase when the difference is more than the pass-under threshold,
   the reference value is maximum value at a point most distant from the objective target out of maximum values of the received electrical power oscillating to the distance to the objective target, and
   the target determination section is configured to determine the objective target as a high target allowing the vehicle to pass under, when the reception tendency determination section determines that the received electrical power has a tendency to be constant regardless of the distance to the objective target and the depth determination value calculated by the determination value calculation section is less than a passing threshold set in advance.

2. The target detection apparatus according to claim 1, wherein the target determination section is configured to determine the objective target as a target not allowing the vehicle to pass under, when the reception tendency determination section determines that the received electrical power has a tendency to increase as the distance to the objective target becomes shorter.

3. The target detection apparatus according to claim 2, further comprising a determination value calculation section configured to calculate a depth determination value representing a depth of the objective target, wherein
   the target determination section is configured to determine the objective target as a middle target having a probability of a collision with the vehicle, when the reception tendency determination section determines that the received electrical power has a tendency to increase and the depth determination value calculated by the determination value calculation section is more than a passing threshold set in advance.

4. The target detection apparatus according to claim 2, further comprising a determination value calculation section configured to calculate a depth determination value representing a depth of the objective target, wherein
   the target determination section is configured to determine the objective target as a low target allowing the vehicle to drive over it, when the reception tendency determination section determines that the received electrical power has a tendency to increase and the depth determination value calculated by the determination value calculation section is less than a passing threshold set in advance.

5. A computer-implemented method for performing target detection by a vehicle equipped with a radar sensor, the computer-implemented method comprising:
   detecting a target in a traveling direction of the vehicle from a detection result of the radar sensor that, at every measurement cycle set in advance, sending and receiving a radar wave and detects a position and a speed of a reflection point where the radar wave is reflected;

following an objective target that is a target detected over a plurality of measurement cycles;

determining a tendency of received electrical power of a reflected wave from the objective target relative to a distance from the vehicle to the objective target on the basis of a result of following the objective target;

determining, in response to determining that the received electrical power has a tendency to be constant regardless of the distance to the objective target, the objective target as a high target allowing the vehicle to pass under; and calculating a depth determination value representing a depth of the objective target, wherein determining the tendency of received electrical power of a reflected wave comprises determining the received electrical power to have a tendency to be constant based on a difference obtained by subtracting a reference value from a maximum value being less than a pass-under threshold set in advance, and determining the received electrical power to have a tendency to increase based on the difference being more than the pass-under threshold, the reference value is the maximum value at a point most distant from the objective target out of maximum values of the received electrical power oscillating to the distance to the objective target, and the objective target is determined as a high target allowing the vehicle to pass under, based on determining that the received electrical power has a tendency to be constant regardless of the distance to the objective target and the depth determination value being less than a passing threshold set in advance.

* * * * *